Feb. 19, 1952     J. E. TYLER     2,586,746
PHOTOMETRIC DEVICE
Filed Aug. 31, 1949
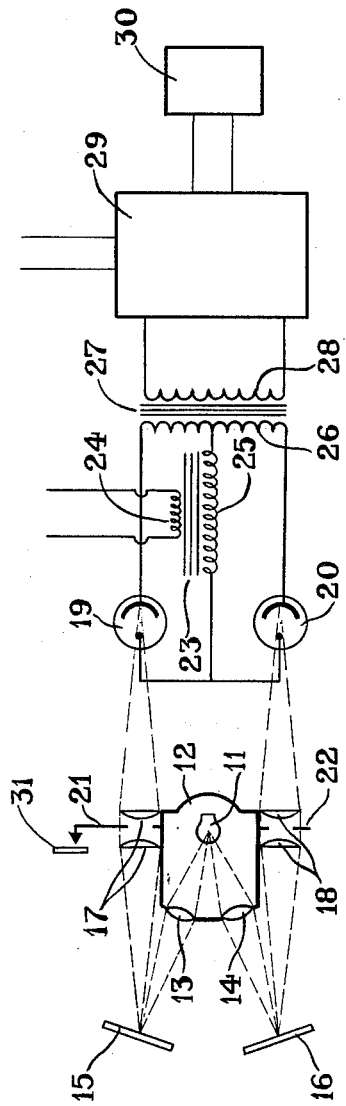
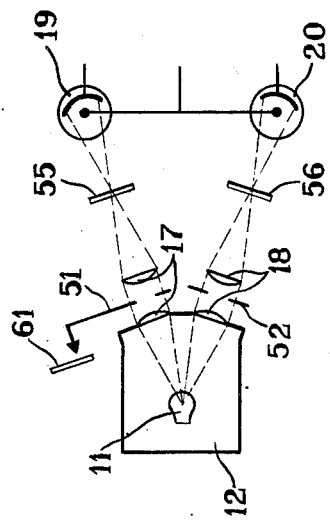
INVENTOR.
John E. Tyler
BY Patented Feb. 19, 1952

2,586,746

UNITED STATES PATENT OFFICE 2,586,746

PHOTOMETRIC DEVICE

John E. Tyler, Riverside, Conn., assignor to Interchemical Corporation, New York, N. Y., a corporation of Ohio Application August 31, 1949, Serial No. 113,259

2 Claims. (Cl. 88—23)

This invention relates to photometric devices and more particularly to null-type instruments characterized by employing two photosensitive elements for the measurement of light characteristics.

Most of the prior devices for the measurement of light according to modern scientific knowledge are based on the principle of producing a beam of light, splitting the beam and modulating it by optical or mechanical means before or after splitting. Such instruments are costly and require a high degree of technical perfection in construction and operation. The object of this invention is to answer the commercial requirement for relatively simple and inexpensive devices which, nevertheless, permit a speedy and accurate measurement of light characteristics, such as optical density, transmittance and reflectance of monochromatic and heterochromatic light, or spectro-matching and the like.

For this and other objects of the invention which in part are obvious and in part will appear hereinafter, I provide a light source suitably selected for the specific task and direct beams of light from this source to a matched pair of phototubes which are actuated by a common source of alternating voltage, such as the secondary of a voltage supply transformer. Connecting the phototubes in series across the primary of a high impedance transformer which is center-tapped by the secondary of the aforesaid voltage supply transformer enables me to connect the phototubes, by means of the said high impedance transformer secondary, to signal amplifying means which, in turn, can be connected to, say, a balance point indicator and to other signal operated devices suitable for recording, actuating, or rejecting.

The effect of this arrangement is to produce a current in each phototube which is proportional to the amount of light falling on the cathode surface of the phototube. The voltage output of the phototubes is rising and falling periodically with the variations in the magnitude of the supplied voltage. The current pulses from the two phototubes occur at the same time and have the same wave shape, but they are travelling in opposite directions in the center-tapped high impedance transformer primary. Consequently, if they are equal in magnitude they cancel each other and no current is induced in the secondary of this transformer. If, however, the light striking one phototube differs from the light striking the other phototube, the current pulses in the center-tapped transformer primary will not cancel each other. Instead, there will be a residuary current which will not only be equal to the vector sum of the two opposite pulsations, but the magnitude of which will be proportionate to the degree of optical unbalance between the light beams striking the two photocells. Moreover, the phase of this residuary current will depend upon which photocell is impinged with more light.

Now, if one of the beams is first directed at, say, a surface of a given optical value and reflected from there toward one of the phototubes and the other of the two beams is directed at an identical surface to be reflected from there toward the other phototube, provided that the phototubes are exactly equal in their response to this particular radiation or are made equal by suitable optical or mechanical adjustments, no signal will ensue. However, if the light reflected by one of the surfaces differs in intensity from the light reflected by the other surface, the residuary current in the primary produces an induction voltage in the secondary coil, the magnitude and phase of which can be readily determined after proper amplification.

The invention is illustrated in the accompanying drawing, in which—

Fig. 1 is a schematic view of one arrangement of the disclosed device, and Fig. 2 is a schematic view of a differently arranged part of the device.

Referring more specifically to the drawing, Fig. 1 shows one embodiment of my invention, suitable for the measurement of the reflectance of a sample as compared with a standard. In the drawing, the numeral 11 indicates a source of light which can be a continuous or a fluctuating source of light, for instance one being subject to constant variations in intensity. As far as the kind of light is concerned, the source can be one of monochromatic or heterochromatic radiation. The light source in this specific instant is a tungsten filament incandescent lamp, placed within a chamber 12, which has openings at one side thereof to accommodate two identical lenses, such as the double convex lenses 13 and 14, capable of collecting light and suitably positioned to direct beams of light toward reflecting surfaces inserted in the path of such light at 15 and 16. The optical system comprises, in addition, two matched pairs of lenses 17 and 18 which serve to collimate light reflected from the surfaces at 15 and 16 and to focus a beam of such reflected light on the cathode of the two vacuum phototubes 19 and 20. Inserted in the path of collimated light between each lens pair are the diaphragms 21 and 22, for the purpose of first accurately balancing the instrument by means of one of the diaphragms and then to carry out the photometric measurement of an unknown surface by determining the degree of attenuation produced by the adjustment of the other diaphragm in order to equalize the current output of the two phototubes.

The diaphragms 21 and 22 can be replaced by standard density wedges or by Nicols or by Polaroid sheets (polarizing disks) as photometering elements. I find the circular type of density wedges especially useful, if provided with a per cent scale at the margin and with a fixed pointer for reading the setting of the wedge.

The phototubes 19 and 20 have a common voltage supply, provided by the transformer 23 having a primary 24 joined to, say, a 110 volt A. C. power line and a secondary 25 which is part of a circuit supplying voltage to the two phototubes in series across the primary 26 of a high impedance transformer 27, being center-tapped by the said secondary 25 of the voltage supply transformer 23. For best results the impedance of the primary 26 must be matched to the impedance of the phototubes and should be of at least 180,000 ohms. The signals generated in the primary 26 whenever there is unbalance in the voltage output of the phototubes generate induced currents in the transformer secondary 28 which are amplified by means of the voltage amplifier 29, which in turn can be connected to balance indicating means, such as the oscilloscope 30.

In operating the device the best practice is to first insert two identical standards at 15 and 16, attenuate the light reflected from the standard at 16 until the two phototubes are in balance, replace the standard at 15 by the sample to be tested and adjust the attenuating means 21 until the balance point indicator 30 again reads zero. The degree of attenuation indicated at the per cent scale 31 provides as direct measurement of the amount of light reflected by the sample in terms of light reflected by the standard.

In order to eliminate stray light, the instrument is preferably enclosed in a case not shown in the schematic drawing. The case is conveniently provided with portholes on one side to receive the standards and the samples and adapted to facilitate control of the attenuating means and reading of the degree of attenuation as well as observation of the balance point indicator from the outside.

By introducing the proper filters, say, behind the attenuating means 21 and 22, measurements of optical characteristics can be made in monochromatic light. Or a single filter can be inserted between the light source 15 and the lenses 13 and 14.

Fig. 2 is a schematic view of part of the device, arranged for the determination of light transmittance of samples in comparison with standards. By means of matched lens pairs 17 and 18 two beams of light originating from the source 11 are directed each at the cathode surface of one of the vacuum phototubes 19 and 20. Inserted in the path of one beam is a transmittance standard 56, in the path of the other beam a sample 55 and, between the lenses of each pair, density wedges or other attenuating means 51 and 52, one of them being provided with a per cent measuring scale 61.

Additional uses of the herein-disclosed device are spectro-matching of phototubes or comparing the energy output of light sources, such as determining the efficiency of tungsten lamps with time of service. In this case the light sources themselves take the place of standard and sample.

I claim:

1. In combination with two light sources and attenuating means for each source, one of the said attenuating means having a per cent calibration, a matched pair of phototubes, each positioned to receive light from one source, a voltage supply transformer, a high impedance transformer, circuit means connecting the secondary of the said voltage supply transformer in parallel to the said phototubes and to a center tap of the primary of the said high impedance transformer and the said phototubes in series across the said primary of the high impedance transformer, and, linked to the secondary of the said high impedance transformer, means for amplifying and detecting phototube signals and for determining the phase of such signals.

2. In a photometric apparatus comprising a source of light, an optical system directing one beam of light from said source at a standard and another beam of light from said source at a sample, and attenuating means inserted in the paths of the said two beams, one of the said attenuating means having a per cent measuring scale, the improvement comprising two substantially identical phototubes positioned one to receive light from the standard and the other to receive light from the sample, a voltage supply transformer, a high impedance transformer, circuit means connecting the secondary of the said voltage supply transformer in parallel to the said phototubes and to a center tap of the primary of the said high impedance transformer and the said phototubes in series across the said primary of the high impedance transformer, and, linked to the secondary of the said high impedance transformer, means for amplifying and detecting phototube signals and for determining the phase of such signals.

JOHN E. TYLER.

REFERENCES CITED

The following references are of record in the file of this patent:

UNITED STATES PATENTS

| Number | Name | Date |
|---|---|---|
| 1,774,457 | Singleton | Aug. 26, 1930 |
| 1,919,182 | FitzGerald | July 18, 1933 |
| 2,213,534 | Rowe | Sept. 3, 1940 |
| 2,245,034 | Harrison | June 10, 1941 |